United States Patent
Spijkerman

(10) Patent No.: US 10,130,109 B2
(45) Date of Patent: Nov. 20, 2018

(54) ADDING OF INGREDIENTS TO A GRANULAR PRODUCT

(71) Applicant: TETRA LAVAL HOLDINGS & FINANCE S.A., Pully (CH)

(72) Inventor: Harrie Spijkerman, Wapenveld (NL)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 212 days.

(21) Appl. No.: 14/902,386

(22) PCT Filed: Jul. 3, 2014

(86) PCT No.: PCT/EP2014/064145
§ 371 (c)(1),
(2) Date: Dec. 31, 2015

(87) PCT Pub. No.: WO2015/001002
PCT Pub. Date: Jan. 8, 2015

(65) Prior Publication Data
US 2016/0366902 A1    Dec. 22, 2016

(30) Foreign Application Priority Data
Jul. 3, 2013    (SE) ..................................... 1350830

(51) Int. Cl.
*A23C 19/06*    (2006.01)
*A01J 25/11*    (2006.01)
*A01J 25/13*    (2006.01)
*A01J 25/12*    (2006.01)

(52) U.S. Cl.
CPC ............. *A23C 19/06* (2013.01); *A01J 25/111* (2013.01); *A01J 25/117* (2013.01); *A01J 25/12* (2013.01); *A01J 25/13* (2013.01)

(58) Field of Classification Search
CPC . A01J 25/111; A01J 25/12; A01J 25/13; A01J 25/117; A23C 19/06
See application file for complete search history.

(56) References Cited

U.S. PATENT DOCUMENTS 3,528,821 A    9/1970 Stenne
3,887,718 A    6/1975 Hinds, Jr.

FOREIGN PATENT DOCUMENTS

EP    0 779 032 A1    6/1997
SU    931134 A1    5/1982

OTHER PUBLICATIONS

International Search Report (PCT/ISA/210) dated Sep. 26, 2014, by the European Patent Office as the International Searching Authority for International Application No. PCT/EP2014/064145.
Written Opinion (PCT/ISA/237) dated Sep. 26, 2014, by the European Patent Office as the International Searching Authority for International Application No. PCT/EP2014/064145.

*Primary Examiner* — Subbalakshmi Prakash
(74) *Attorney, Agent, or Firm* — Buchanan Ingersoll & Rooney PC

(57) ABSTRACT

A method for adding ingredients to a mass of curd, comprises a step of separating whey from curd grains, a step of transferring curd grains from the separating step to a step of arranging the curd grains in a mould. A step of adding the ingredients is performed in the transferring step.

15 Claims, 3 Drawing Sheets

ADDING OF INGREDIENTS TO A GRANULAR PRODUCT

TECHNICAL FIELD

The present invention relates to food processing, and in particular it relates to adding ingredients to food product during production thereof. The invention will be exemplified within the field of cheese making.

BACKGROUND

While the basic steps of cheese making have been unchanged for centuries the production process is continuously improving. An important driver is to maintain or improve quality of the end product while rationalizing the process, i.e. a goal common to several applications within the field of food processing.

Adding ingredients to cheese may be done in several manners. Generally the procedure of adding an ingredient involves mixing devices which distribute the ingredients in the curd mass, or complex dosing systems which spread ingredients over a large area or volume of curd. Other methods involves dosing all ingredients at once into a batch of curd and whey, which subsequently is mixed in curd vats or buffer tanks over time to achieve proper distribution. Known methods suffer the drawback of being time consuming in regard of dosing and distribution of ingredients. Also, if the ingredient of a consecutive batch differs from the ingredient used in a present batch the time and effort needed for proper shift-over between ingredients (to prevent drag of ingredients between batches or different types of cheeses as ingredients attach to equipment parts and layers) is considerable. Another cumbersome operation may be the pre-processing of ingredients to achieve right ingredient behaviour after dosing to achieve proper distribution. Such pre-processing may include pre-wetting ingredients to prevent ingredients to float or sediment into a batch of curd and whey.

Further to the drawbacks related to time consumption there is also the issues of product losses. There may be high losses of ingredients due to fouling, where the ingredient is lost to the equipment, or retention to whey (instead of retention to cheese), where the ingredient is drained off when the whey is drained off, and apart from being a poor use of ingredients, the fouling of the whey reduces its value or blocks its normal way of processing to whey based dairy products. Mechanical mixing of curd for the purpose of mixing in ingredients may result is higher amount of curd fines and thus in losses of curd (e.g. curd fines lost to whey) or loss of desired curd properties (e.g. loss of moisture and fat). The introduction of complex or massive machinery to spread ingredients over a large area of curd, or to distribute ingredients throughout a large volume of curd introduces associated costs, yet also fouling areas which require cleaning procedures to properly remove curd remains and ingredient remains during switch of ingredients.

An aim is to eliminate or at least alleviate one or more of these drawbacks. Though being limited to cheese production in its description, the device and methods may be used in other applications where it is desired to add a smaller amount of ingredients or additives to a larger amount of granular product.

SUMMARY

For the achievement of some or all of the stated objectives a method for adding ingredients to a mass of curd, comprises the step of separating whey from curd grains, and a step of transferring curd grains from the separating step to a step of arranging the curd grains in a mould, wherein a step of adding the ingredients is performed in the transferring step.

This method will address most drawbacks identified in prior art, some of which will be more clearly disclosed in relation to further embodiments of the invention.

In one or more embodiments the step of transferring the curd grains comprises allowing the grains to fall under gravity from a separating device to a mould. The unconstraint transport minimizes fouling as well as wear on curd grains. In some embodiments the grains may fall freely, and in other embodiments a mass of falling curd particles will be gently guided to a particular part of a mould.

The added ingredients may in some embodiments be transported to an injection point by means of a fluid flow. Examples include that the ingredient may be entrained in a gas flow or entrained or mixed into a liquid flow. Some examples will be further described in the detailed description.

In one or several embodiments the curd grains are allowed to fall under gravity as the ingredients are added to them. The velocity and rotation of the curd grains as they fall, as well as collisions between curd grains, will stimulate a chaotic pattern of movement, which in turn facilitate a good mix and distribution of ingredient in the mass of curd grains. One clear advantage is that since the curd grains are falling freely, there is no processing equipment that can be fouled by curd grains or ingredient.

In any one of the embodiments above or below the step of separating the curd grains from the whey may be performed with separation means in the form of a conical sieve. For the present application a beneficial effect will be that a momentum will be imparted to the curd grains as they accelerate down the sloping walls of the conical sieve, and at the same time they will be concentrated to a smaller volume. Both these effects will benefit the mix in of ingredients. When the addition of ingredient is commenced the curd grains will tumble and rotate as they exit the sieve, which further improves the mixing.

To further improve the method and the corresponding device the sieve may be rotating around a longitudinal axis of symmetry. Having a rotating sieve adds several benefits to the present invention. The rotation may facilitate and improve the distribution of curd grains over a filter area, and also tumbles the curd grains as the mass of falling curd grains reaches the mixing area. The rotation may also induce further momentum to the curd grains. Another more general advantage is that the rotation may reduce the risk of curd grains adhering to the sieve, which could result in an uneven flow of curd grains.

Adding to the rotational movement, or used as an alternative, the conical sieve may also be arranged to vibrate. A vibration may result in advantages partly overlapping with the beneficial effects of rotation, yet with an emphasis on that it will assist in preventing curd grains from clinging in to the sieve.

In one or more embodiments the step of adding of ingredient to the curd grains may be performed by arranging a nozzle in a narrow region of the conical sieve ejecting a flow of fluid and ingredient in a longitudinal direction towards an outlet of the conical sieve. In this way the added ingredient will be injected in the centre of a flow of curd grains, and it will be directed outwards and away from the conical sieve such that satisfactory mixing is achieved without excessive fouling of processing equipment. In one or more embodiments the nozzle is arranged along the longitudinal axis of symmetry of the conical sieve. The nozzle may be embodied as a specially designed nozzle, optimized for the product to be added, yet in the present embodiment it merely consists of one end of the ingredient conduit. It is preferred that the ingredient is added in a position such that there is little or no risk for the ingredient to contact the operational part of the sieve, in order to facilitate cleaning and minimise efforts to prevent drag of ingredients at product or ingredient shift-over. The fluid may be air entraining a dry or moistures ingredient or water (or another fluid) entraining or containing a wet ingredient.

The method may comprise, preceding the already mentioned steps, the step of pumping a mix of curd grains and whey from a buffer tank to a separation means.

According to a second aspect the invention relates to a device for adding ingredients to a mass of curd grains. Such a device will have an inlet end for receiving a mass of curd grains and an outlet end directing the curd grains towards a mould, wherein a nozzle for injecting ingredient in the mass of curd grains is arranged in the area of the outlet end. "In the area of the outlet end" may designate several different positions, and examples include in the same level of the outlet end, slightly upstream the outlet end, or slightly downstream the outlet end. A point with this position is that the ingredient may be added to the curd grains in an efficient manner without fouling the equipment. For this reason it may also be preferred that the nozzle is arranged to inject the ingredient in a downstream direction, i.e. out through the outlet end, in most cases in the same direction as the curd grains are heading during operation. In a use position it is generally the case that the inlet end is arranged at a higher level than the outlet end, such that gravity may be the force driving the curd grains through the device.

Advantages related to an inventive device or a device according to any one of the disclosed embodiments should be apparent from studying the similar method above or the detailed description to follow.

An advantage of the invention is that the undesired behaviours of ingredients when added to a fluid, ie. flooting, sedimenting, dissolving are for major part overcome as ingredients are directly dosed to the pre-drained curd particles where they attach to their wet surfaces. Dissolvable ingredients can only partly dissolve in the limited film of whey covering the pre-drained curd particles and retention to the cheese is increased by quick start of pressing entrapping the ingredients in the cheese body or by adding dissolvable ingredients into so called carriers, such as lactose, starch, salt which will release the ingredients to the cheese in time after the cheese is pressed.

According to one or more embodiments the device may have sloping sidewalls such as to impart a momentum to the curd grains on their way from the inlet to the outlet. The sloping sidewalls may form part of a conical sieve, arranged to separate the curd grains from residual whey. In one or more embodiments the conical sieve may be arranged to rotate and/or vibrate in accordance with the present description.

In one or more embodiments a nozzle is arranged for the injection of ingredient to the curd grains. The nozzle may be arranged to inject a mixture of gas and ingredient in a direction out through the outlet of the device, such that mixing of ingredients and curd grains is effected when the curd grains are unsupported by the device. Further, the nozzle may be arranged in a narrow region of the conical sieve ejecting a flow of gas and ingredient in a longitudinal direction towards an outlet of the conical sieve. In an alternative embodiment the nozzle injects a mixture of liquid, preferably water, and ingredient. Addition of ingredient with a mixture of gas, e.g. being air, has the advantage that the gas flow is adding a better and more constant control on the speed and path of ingredients and prevents internal fouling of the dosing unit as the constant flow of gas prevents high humidity around the curd mass to enter the inner sides of the dosing units.

The nozzle may be embodied as a specially designed nozzle, optimized for the product to be added, yet in the present embodiment it merely consists of the ingredient conduit. It is preferred that the ingredient is added in a position such that there is little or no risk for the ingredient to contact the operational part of the sieve, in order to facilitate cleaning.

In order to e.g. handle a number of different ingredients one or several additional nozzles may be provided for injecting at least one additional ingredient.

The one or several additional nozzles may be placed next to said nozzle. Alternatively or as a complement one or several additional nozzles may be placed inside said nozzle.

According to a third aspect it is provided a device for adding ingredients to a mass of curd grains, having an inlet end for receiving a mass of curd grains and an outlet end directing the curd grains towards a mould, wherein a nozzle is provided for injecting ingredient in the mass of curd grains in the area of the outlet end.

The same advantages and embodiments mentioned in relation to the other aspects also apply for this third aspect.

For ingredients comprising larger particles it may be sufficient to have the nozzle provided in an upper part of the device such that the ingredients can fall down into the area of the outlet end.

Ingredients dosed may be distributed throughout the curd mass as result of the tumbling and turbulent path of curd grains downwards to the mould without use of additional ingredient mixing and distribution tools.

Further fouling of dosed ingredient may be limited to the moulds merely and not to equipment surfaces and parts.

For the purposes of avoiding repetition of entire paragraphs; In embodiments where the invention is used for other granular (food) products the teachings in the above or below description may still be valid. A mere replacement of "curd grains", "cheese", "whey" and similar limiting wordings with corresponding appropriate designations for the particular granular product will suffice.

DETAILED DESCRIPTION OF EMBODIMENTS

Figure 1:
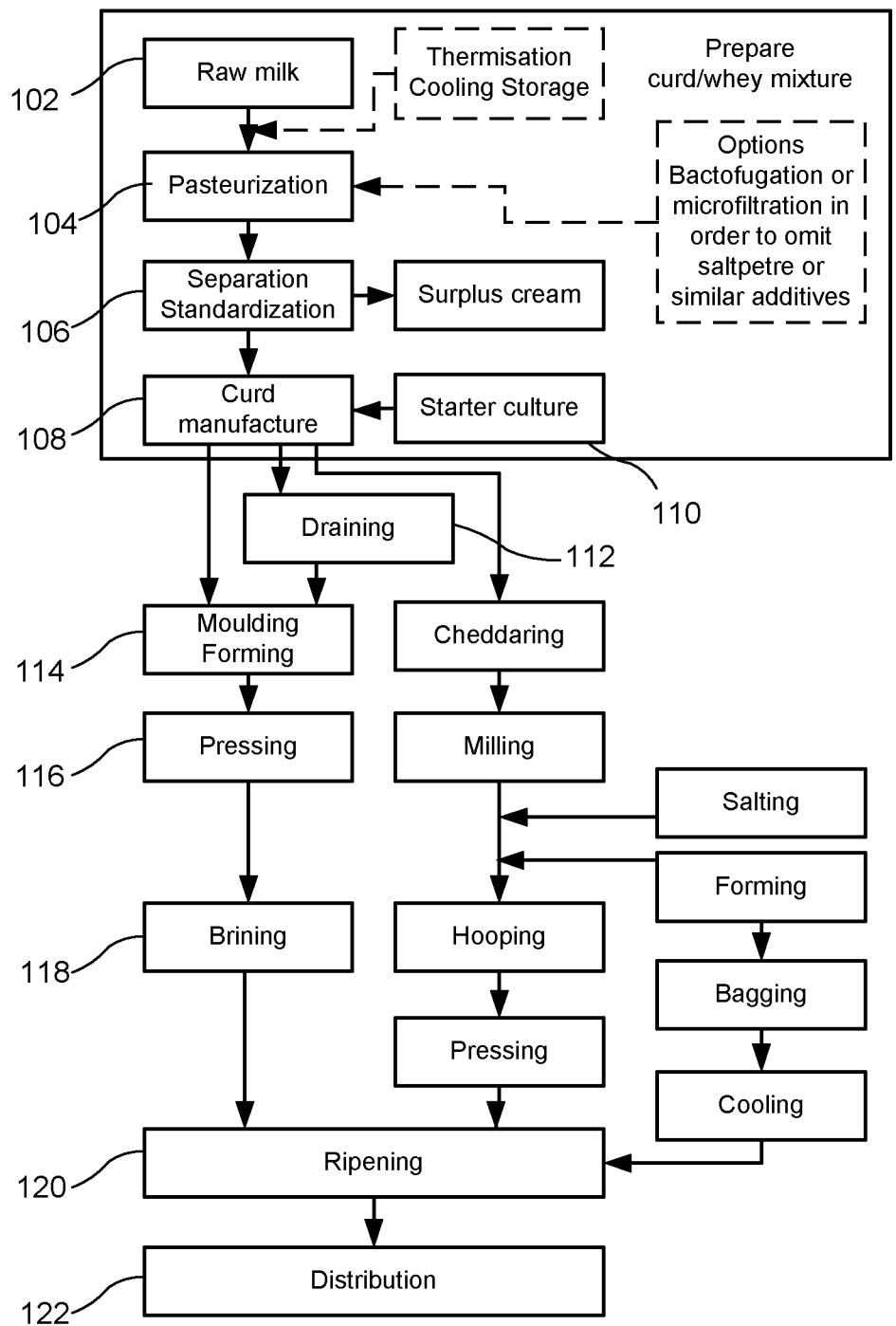
FIG. 1 is a flowchart for a typical process of manufacturing cheese.

FIG. 1 illustrates a flow chart for a typical process of manufacturing cheese, in this particular example semi-hard cheese or cheddar cheese. The flow chart is quite complex in that it includes several available optional process steps, and for the purposes of the present invention it is sufficient to consider a portion of the leftmost track. With that starting point a process of manufacturing a semi-hard cheese may comprise the steps of manufacturing curd (step 108) by raw milk (step 102) being pasteurized (step 104) and separated and standardized (step 106) using a starting culture (step 110), rennet, etc, all in accordance with prior art. In a consecutive step 112 the curd is drained, i.e. the whey is removed to the largest extent possible. Cutting of curd into granules of desired size facilitates drainage of whey. Following the draining 112 the curd is arranged in a mould (step 114) fully or partly defining the shape of the cheese, or is formed in another manner. Subsequent steps may include a Pressing step 116, a Brining step 118 and Ripening step 120 before the end product is distributed in step 122.

During the cheese manufacturing process further ingredients may be added in order to affect flavour and texture of the cheese, as well as the shelf life. Common ingredients include salt, microbiological cultures, colours, flavours and spices. Since the present invention relates mainly to the addition of ingredients a brief discussion around techniques that may be used will be given. There are several ways of adding ingredients, examples including:

Adding ingredients into a large volume of curd and whey, i.e. adding ingredients prior to draining, e.g. adding ingredients at the same time as the curd is cut into granules, or before or after that step. This method will ensure a good mix-in of ingredients, yet there is an apparent risk that a significant amount of ingredients may be washed away in the draining step, resulting in losses. One further effect will be that most of the processing equipment will be contaminated with the ingredient in question, implying that there is an significant amount of cleaning associated with changing of product, even if the change itself is limited to shifting flavours of the cheese.

Adding ingredients inline to a curd-whey mixture as the mixture is pumped over to a draining and forming unit (or at inlet of this unit). If compared with the first technique described this adding procedure has an advantage in that ingredients are dosed into a more concentrated volume of curd and whey in which majority of whey is already removed in prior machinery reducing losses to whey and limiting the amounts of ingredient fouled whey. The problem associated with change of ingredient, i.e. the cleaning issue, would still be a problem.

Adding ingredients inline to pre-drained curd and mixing it up throughout the whole curd mass is a technique commonly used in the process of manufacturing Cheddar cheese and Pasta Filata. Salt or brine is dosed over curd in a mixing unit (using a single dosing unit) or over a larger area of curd on a conveyor (e.g. with multiple dosing units like sprayers). Similar to the previous example an advantage of these systems is that ingredients are added after majority of whey is drained from the curd and less whey is contaminated/fouled with ingredients. A disadvantage is that mixing tools are required to distribute ingredients throughout the whole curd mass. These tools including product contact areas of processing equipment will need to be cleaned intensively and further to this, tools which add mechanical forces to curd may damage the curd, which may result in product losses (e.g. by an increase amount of curd fines). A variation of this technique involves manual spreading of ingredients over a layer of pre-drained curd and mixing it up manually (or automated). This variant is hardly used in industrialized processes, but in combination of pre-press vats it is known that some herbs which cannot be mixed up well in curd and whey mixtures are spread manually over a large curd bed area and afterwards are manually mixed up.

The present invention strives at optimizing a process of dosing small quantities of ingredients to large quantities of curd and getting it well distributed throughout the mass. This process should be performed with minimal time consumption, minimal fouling of equipment, minimal damage to ingredients or curd, minimal losses of ingredients, minimal drag of ingredient remains between batches and minimal retention of ingredients to whey combined with proper distribution of the ingredients throughout the cheese mass. Though the present description embodies the invention in the context of manufacturing of cheese, it may be applied to other fields as well, e.g. where flavours, color agents, or other ingredients are to be added to a granular material.

Figure 2:
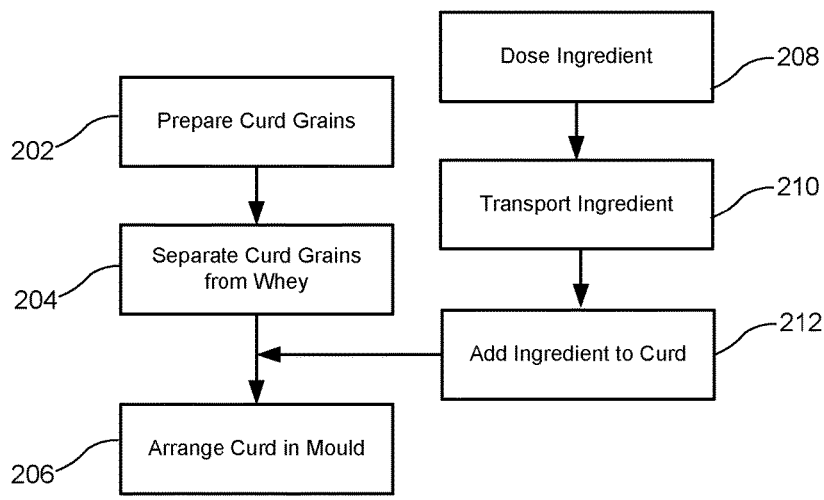
FIG. 2 is a flow chart outlining a process according to one embodiment of the present invention.

According to one aspect of the present invention it relates to a method for adding ingredients to a granulated product, which in the following will be described in relation to an embodiment where ingredients are added to curd grains in a step of manufacturing cheese. Such a method is disclosed in FIG. 2 and will be described in the following, and it basically comprises two paths and a junction point where the two paths meet. The first path (to the left in FIG. 2) represents a regular cheese manufacturing process, where a curd is prepared from processed milk, summarized in step 202. The curd is subsequently cut into curd grains and are separated from the whey in step 204 and arranged in moulds in step 206. The second path (to the right in FIG. 2) represents an ingredient-addition track, where one or more ingredients are dosed (step 208), transported (step 210), and added to the curd (step 212). A pre-mix of ingredients is thus dosed as one combined stream to the curd, but it is also possible to dose multiple ingredients separately to the curd using multiple dosing (208), transport (210) and addition units (212).

The step of adding the ingredient will occur after a step of separating curd grains from whey, and before or during a step of arranging the curd grains to a mould. In a preferred embodiment the addition is made in a transition area between the separating step 204 and the arranging step 206. It is to be understood that more whey will be separated from the curd grains during the subsequent step of pressing the mass of curd grains in the mould, yet after the separating step 204 in the inventive method to achieve best performances most whey has been separated. Reflecting on the objects to be achieved the disclosed method will result in a minimal fouling of equipment since it is performed basically as a last processing step before arranging the curd grains in the mould, and at best in the transition period of curd falling from processing equipment into a mould limiting ingredient contact to (almost) only the curd and mould. Further beneficial effects include that there will be a minimal loss of ingredients (which in other methods may be lost when the whey is drained), and an associated advantage is that the dosing of ingredient may be reliably determined since most whey has been drained when the ingredient is added.

In a further embodiment the adding of ingredient is performed as the curd grains fall under gravity from the separating step to the arranging step, which will minimize damage induced on the curd as compared to a method where mechanical mixing is performed. This will be described in more detail in the detailed description referring to a device adapted to perform an inventive method.

In the step 208 of dosing the ingredient the amount of ingredient added to a certain amount of curd is controlled. The amount as such depends on a particular recipe to begin with, and starting from that recipe the rate at which the ingredient as added will be dependent on a feed rate for the curd grains, the amount of whey residues, etc. Such considerations all relate to control issues which a skilled person would handle if given the direct task to do so. There are several options regarding what hardware to use for the feed of ingredient in the dosing step 208, and the one envisaged in the present embodiment is a dosing screw of conventional design and hygienic dosing pumps for liquid ingredients. The exact type of dosing screw and pump used is preferably matched to the type of ingredient to be added.

In the preferred embodiment the transport 210 of the ingredient to the junction point (where the ingredient is added to the curd) is performed by means of an airstream carrying the ingredient in a transport conduit. The use of an airstream will have several advantages, one being that the mix of air and ingredient will facilitate the mixing of ingredient and curd grains at the junction point. Simply put the curd grains will be sprayed with ingredient in the transition from the separating step to the arranging step, which will provide a more efficient mixing than if the ingredients would be merely poured into the curd grains. In one or more embodiments the flow of air may be added to the transport conduit in such a way that an ejector effect is achieved, i.e. that the ingredients are sucked into the transport conduit by an under pressure generated by the flowing air. Such an ejector effect may be accomplished by adding the flow of air downstream the point where the ingredient is dosed, or added upstream the same point, i.e. there are more than one constructional solution for obtaining an ejector effect (venturi feed, eductor feed and other terms may be used with a basically analogous meaning). The theory behind the ejector effect and ejectors is considered to be well known, and it will not be discussed in any further detail in the present disclosure.

The disclosed manner in which the ingredient is dosed and transported to the curd is simple and straightforward, it basically consists of a dosing device and a pipe leading the ingredient to the curd. This non-complex layout vouches for a reliable operation and simple cleaning. More complex options could include an active nozzle where the dosing as such is effected by settings of the nozzle, comparable to a fuel injector. Such solutions are not excluded from use in embodiments of the present invention, though they are presently not preferred. The air may obviously be replaced with another gas if considered suitable. In still other embodiments a fluid such as water may be used to transport the ingredient to the junction point, and in still other embodiments the fluid as such will constitute the ingredient. A situation where the ingredient is a liquid opens up for an injector type nozzle which may be controlled by injection pressure and opening characteristics (time, dimensions etc), or merely by control of a mass flow, both providing controllable and well established methods in other fields of technology.

In the present embodiment the mix of ingredients and air is injected into a mass of falling curd grains that have left the separating step 204 and are about to enter the arranging step 206. The motion of the ingredients combined with the motion of the curd grains will ensure a satisfactory mixing of the two. In the particular embodiment where curd grains are used the ingredient added will be prone to adhere to the surface of the curd grains since this surface is moist. In such an embodiment it may be preferred that the ingredients are added in a dry format, but added ingredients may also be in a moistures format such as parts of fruit, vegetables and others It may be preferred to introduce the ingredient in a symmetrical way, such as to promote an even and homogenous distribution of ingredient. In one embodiment to be shown an injection nozzle is arranged concentrically in an outlet of a separation device, such that may inject the ingredient into and along with the mass of falling curd grains encircling the injection nozzle in a doughnut shape, which will also be explained in more detail in relation to a particular embodiment.

According to a second aspect the present invention relates to a device for adding ingredients to a granulated product, which in line with the previously disclosed method will be described in an embodiment relating to cheese manufacturing. Most general features of such a device have been disclosed in the description of the embodiment of the inventive method, though reference numerals relating to the device was intentionally left out from that part of the description for the purpose of increasing readability.

Figure 3:
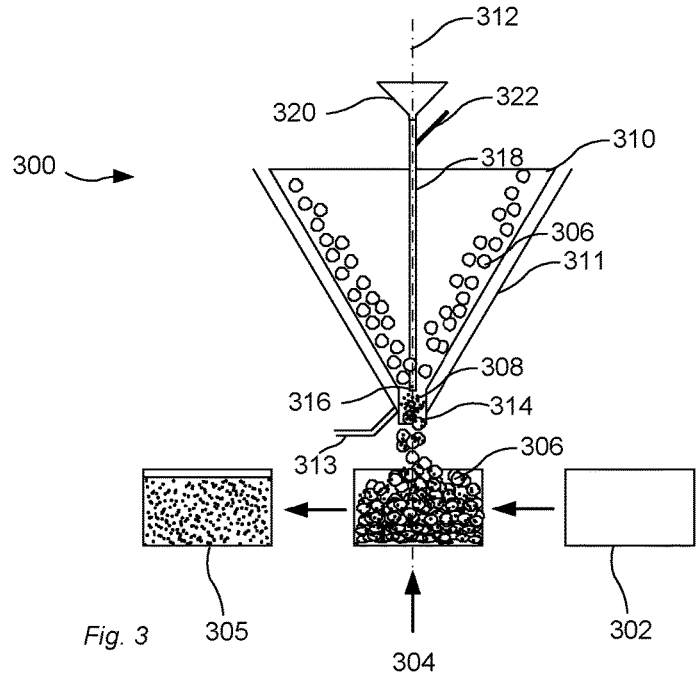
FIG. 3 is a schematic cross section of a device according to a first embodiment of the present invention, including some downstream equipment.
Figure 4:
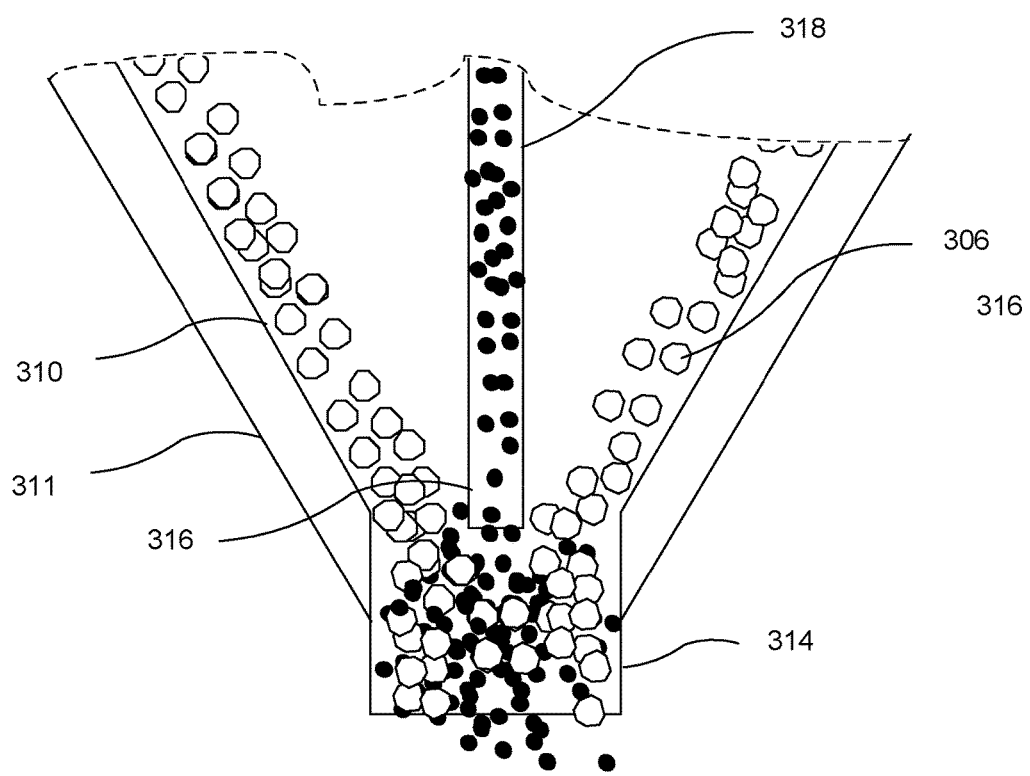
FIG. 4 is a detail view of a mixing region in the device of FIG. 3.

A device 300 for adding ingredient to a mass of curd is shown in the schematic cross section of FIG. 3 showing a portion of a cheese processing line of which an inventive device according to one embodiment of the present invention is utilized. The device 300 may preferably have a shape having a rotational symmetry around a longitudinal axis 312. In FIG. 3 it is shown how empty moulds 302 entering from the right are arranged in a filling position 304 where they are filled with cheese curd 306 (the larger granules in FIG. 3) mixed with ingredient 308 (the smaller granules in FIG. 3) and forwarded to subsequent processing steps. The device 300 is fed with a mix of curd grains 306 and whey (not shown) from a buffer tank or curd preparation vat (not shown). The mix is distributed at one or more locations in an upper portion of a conical sieve 310, which in some embodiments may be arranged to rotate around its longitudinal axis of symmetry 312, resulting in an improved distribution of curd. A major portion of the whey will pass through the sieve 310 and collected as the curd 306 grains follow the sloping walls of the sieve 310 under the influence of gravity. The whey passing through the sieve 310 may follow the interior of an outer shell 311 to a drain 313, where it is collected. While the whey is collected and pumped out from the device 300 the curd grains 306 will fall out of a centrally arranged outlet 314 in a lower end of the conical sieve 310. When falling out the curd grains 306 will fall into a mould 302 arranged immediately below the outlet 314. Guide means (not shown) may be arranged to guide the curd grains 306 and ingredient to a particular portion of the mould, e.g. in order to obtain optimal distribution of curd in the mould. Once the mould 302 is full it will be incremented forward to consecutive processing steps, illustrated by the mould comprising a cheese volume with ingredient distributed therein as shown at 305.

A nozzle 316 is arranged in the area of the outlet, and this nozzle 316 is used to spread and direct the ingredients towards the curd 306. In the present embodiment the nozzle 316 is merely an extension of the conduit 318 leading the ingredients from a dosing device 320 to the curd 306. The nozzle 316 is thus the end of the conduit 318, which may have the form of stainless steel tubing having a circular cross section. In other embodiments the nozzle 316 may comprise one or more deflection plates (not shown) or other flow controllers to guide the flow of ingredients such as to improve the distribution thereof. Such deflection plates may comprise a cone distributing the flow in all directions or an inclined plate deflecting the flow in one direction, yet there are obviously more ways of introducing some extra turbulence in the mixing process. In the present arrangement the dosing device 320 is arranged at a first end of the conduit 318 leading from the dosing device 320 to the nozzle 306 and comprises a dosing screw (not shown in detail). Downstream the dosing device 320 an air conduit 322 branches into the ingredient line. The air will act as a carrier gas and pull the ingredient towards the point of injection (the nozzle). The air will also support the distribution of ingredients onto the curd grains. Also the airstream prevents humidity to enter the interiors of the dosing conduit 318 preventing ingredients to attach to its surfaces. Though air has been used as an example, any other suitable carrier gas may be used, such as nitrogen. The gas may be sterilized, HEPA-filtered or prepared in any suitable way.

In order to stimulate the entrainment of ingredient the air addition point may have an ejector-like configuration. A particular configuration may be optimized on one particular ingredient or group of ingredients to be entrained or arranged to provide an acceptable performance on all or a majority of foreseeable ingredients. In order to stimulate dosing accuracy of ingredients with low flowability properties the air addition point may be pointed direct to or along the ingredient supply point in such way that ingredients are quickly releasing itself when supplied from the dosing device 320.

The embodiments disclosed thus far relates to addition of dry (or moistures) ingredients. If liquid ingredient is to be used, or more generally, if an ingredient carried by a liquid is to be used a different ingredient-feed system should be used, yet apart from that the inventive idea is still applicable. Therefore it may be more appropriate to use the word "carrier fluid" than "carrier gas". If using a carrier liquid a similar ejector technique may be used, though the dosing device may be replaced by one better serving the purpose. An alternative when dealing with liquid-carried ingredients is mixed with water or other liquid in a pre-step, after which the prepared mixture is provided to the injection point at a suitable rate (e.g. a mass-flow rate).

It is possible to dose simultaneously dry and fluid ingredients via separate dosing units placed next to each other, or even one (preferably the fluid dosing conduit) placed in the centre of the other one.

Further, it is possible to dose simultaneously multiple streams of ingredients by dosing them via multiple dosing units at the upper side of the dosing conduit such that the dosing conduit is mixing the multiple ingredients on their way down.

The invention claimed is:

1. A method for adding ingredients to curd grains as part of a cheese making process, the method comprising:
    separating whey from the curd grains using a conical sieve that includes an outlet,
    transferring the curd grains to a mould so that the curd grains are arranged in the mould, wherein
        ingredients are added to the curd grains during the transferring of the curd grains to the mould, and
        the adding of the ingredients to the curd grains is performed by conveying the ingredients through a nozzle arranged in a narrow region of the conical sieve so that the ingredients are added to the curd grains at the narrow region of the conical sleeve, and ejecting a flow of curd grains and the ingredients in a longitudinal direction towards the outlet of the conical sieve.

2. The method of claim 1, wherein the transferring of the curd grains to the mould comprises allowing the grains to fall under gravity from the conical sleeve to the mould.

3. The method of claim 1, further comprising transporting the ingredients to the curd grains by a fluid flow.

4. The method of claim 1, further comprising allowing the curd grains to fall under gravity as the ingredients are added to the curd grains.

5. The method of claim 1, wherein the conical sieve is rotating around a longitudinal axis of symmetry.

6. The method of claim 1, wherein the conical sieve is vibrating.

7. A device for adding ingredients to a mass of curd grains as part of a cheese making process, the device comprising a conical sieve having an inlet end for receiving the mass of curd grains and an outlet end directing the curd grains towards a mould, wherein a nozzle is provided for injecting the ingredients to the mass of curd grains in an area of the outlet end of the conical sieve, wherein sloping sidewalls form part of the conical sieve that is arranged to separate the curd grains from residual whey.

8. The device of claim 7, wherein the sloping sidewalls impart a momentum to the curd grains on their way from the inlet to the outlet.

9. The device of claim 7, wherein the ingredient is mixed into a fluid flow before being injected into the mass of curd grains.

10. The device of claim 7, wherein the conical sieve is arranged to rotate along a longitudinal axis of symmetry.

11. The device of claim 7, wherein the conical sieve is arranged to vibrate.

12. The device of claim 7, wherein the nozzle is arranged to inject a mixture of fluid and ingredient in a direction out through the outlet of the device, such that mixing of ingredients and curd grains is effected when the curd grains are unsupported by the device.

13. The device of claim 7, wherein one or several additional nozzles are provided for injecting at least one additional ingredient.

14. The device according to claim 12, wherein said one or several additional nozzles is placed next to said nozzle.

15. The device according to claim 13, wherein said one or several additional nozzles are placed inside said nozzle.

* * * * *